United States Patent

[11] 3,536,108

| [72] | Inventor | Peter Jurgen Schreiber<br>Doylestown, Pennsylvania |
|---|---|---|
| [21] | Appl. No. | 700,284 |
| [22] | Filed | Jan. 24, 1968 |
| [45] | Patented | Oct. 27, 1970 |
| [73] | Assignee | Fraser Sweatman Incorporated<br>Buffalo, New York<br>a corporation of New York |

[54] FILLING CONNECTION FOR A LIQUID RECEPTACLE
3 Claims, 2 Drawing Figs.

[52] U.S. Cl. .................................................. 141/18,
137/558, 137/571, 137/581, 137/588, 141/95
[51] Int. Cl. .................................................. F17d 1/00
[50] Field of Search .......................................... 137/216,
571, 572, 581, 583, 587—589, 558; 141/95, 96, 284, 319, 18, 21, 274, 306, 308, 309, 382

[56] References Cited
UNITED STATES PATENTS

| 1,145,289 | 7/1915 | Bothwell ...................... | 137/588 |
| 2,189,658 | 2/1940 | Sibley .......................... | 137/587 |
| 2,779,349 | 1/1957 | Ten Eyck ...................... | 137/571X |
| 2,946,475 | 7/1960 | Rockelman .................. | 137/587X |

FOREIGN PATENTS

| 646,114 | 11/1950 | Great Britain ................ | 137/588 |

Primary Examiner—Laverne D. Geiger
Assistant Examiner—Edward J. Earls
Attorney—Busser, Smith & Harding ABSTRACT: A conduit is connected to a receptacle such as an anesthetic vaporizer with at least a portion of the conduit being flexible and having a valve controlling it. The conduit is detachably connected to a container and has a fixed liquid level control vent pipe connected thereto with a vent opening in the plane of the maximum desired liquid level in the receptacle.

Patented Oct. 27, 1970

3,536,108

INVENTOR
PETER JÜRGEN SCHREIBER

BY Busser Smith & Harding

ATTORNEY

3,536,108

FILLING CONNECTION FOR A LIQUID RECEPTACLE

BACKGROUND OF THE INVENTION

Numerous liquid receptacles such as anesthetic vaporizers require accurate filling with particular regard to the avoidance of over filling and require frequent draining. The primary purpose of this invention is to provide a filling connection which permits rapid filling and draining of a receptacle and positively prevents over filling.

SUMMARY OF THE INVENTION

A filling connection for a liquid receptacle has conduit means which is adapted to be connected to the receptacle and detachably connected to a container. At least a portion of the conduit, generally the outer portion, is flexible to provide for the manipulation of a container filled with liquid to permit attachment to the filling connection and the passage of liquid from the container to the receptacle as well as to permit locating an empty container in a position to receive liquid from the receptacle. A valve is provided in the conduit to control the flow of liquid therethrough. A fixed liquid level control vent pipe is connected to a conduit and provided with a vent opening in the plane of the maximum desired liquid level in the receptacle in order to positively prevent overfilling. Means to vent the interior of the container during the emptying or filling thereof is provided. Advantageously, the liquid level control vent pipe has its opening in the side thereof which is protected by a spaced shield to prevent the use of the opening for the introduction of a liquid. Similarly, the detachable connection is advantageously a female member adapted to cooperate with a cooperating male member with the female member being provided with drainage openings to prevent its use as a funnel. The last two mentioned aspects of the invention may require that the filling be carried out with a special container having a particular male fitting which is useful to prevent filling with the wrong liquid, an important consideration in many cases such as with an anesthetic vaporizer.

DESCRIPTION OF PREFERRED EMBODIMENT

Figure 1:
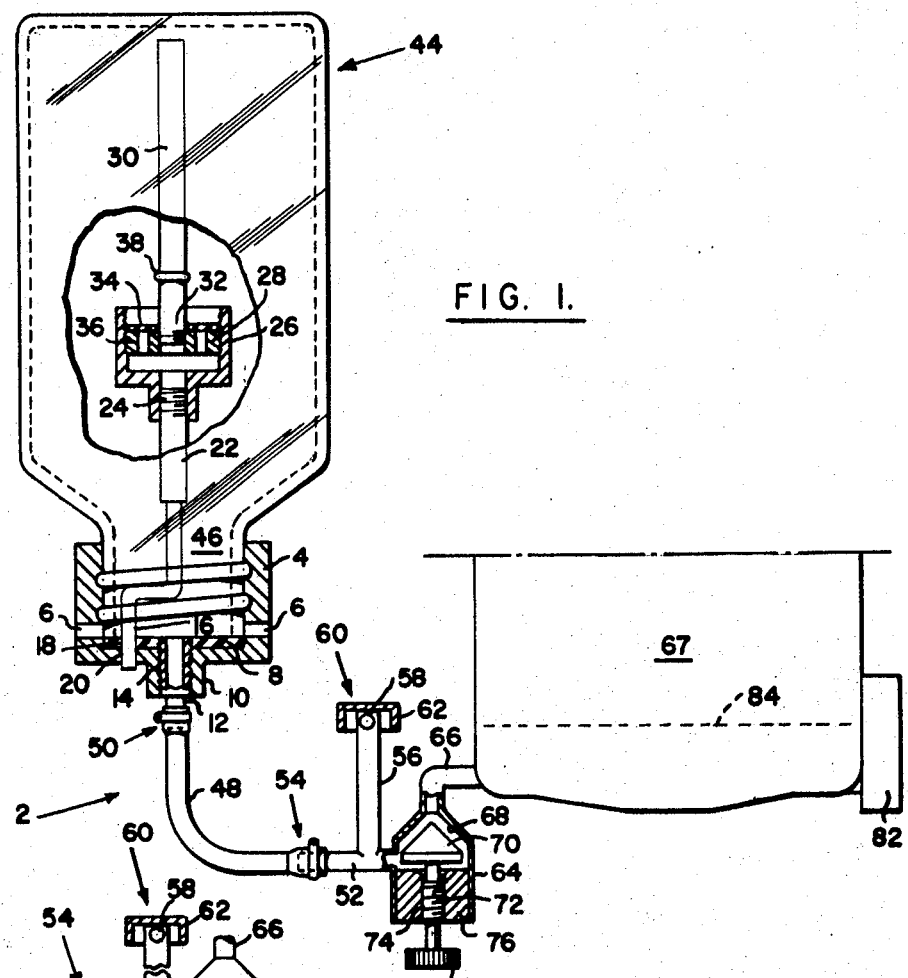
FIG. 1 is a front elevation, partially broken away, of a filling connection in accordance with the invention showing a container in a position to deliver liquid to a receptacle.

Referring first to FIG. 1, a fitting connection 2 in accordance with the invention is provided with a threaded female connector 4 having drainage openings 6 and a washer 8 below said openings 6. A reduced neck portion 10 is threadably engaged by a tube 12 as indicated at 14.

To provide for venting, a rigid pipe 16 passes through an opening 18 in washer 8 and through an opening 20 in connector 4 in which it is tightly secured by a pressed fit. Pipe 16 has an upper enlarged portion 22 which is threadably connected at 24 to a cup-shaped member 26 into which is threaded a disc 28. A pipe 30 is threadably secured at 32 to disc 28. A valve washer 34 is slidably mounted on pipe 30 and is adapted to close openings 36 through disc 28 when moved against disc 28 by gravity. A bead 38 on pipe 30 limits travel of valve washer 34 in the opposite direction.

A container 44 having a threaded neck 46 is adapted to receive the aforementioned venting structure and to be threadably secured to connector 4 with its outer end tightly against washer 8 to make a fluid tight seal.

A flexible tube 48 is connected to tube 12 by means of a hose clamp 50 and to a rigid tube 52 by a hose clamp 54. A vent pipe 56 is integrally connected to tube 52 and is provided with peripheral openings 58 near the top thereof (only one being shown). The top of the pipe 56 is closed by a shield 60 having a depending apron portion 62 which prevents the introduction of liquid into openings 58 but permits the free passage of air.

Tube 52 is connected to valve body 64 which in turn is connected by a rigid tube 66 to the interior of a vaporizer indicated at 67 which may, for example, be a vaporizer of the type shown in U.S. Pat. No. 2,915,061 issued to W. Edmondson et al., Dec. 1, 1959, or any other receptacle which requires accurate filling and emptying. Valve body 64 provides a valve seat 68 which is adapted to be engaged by valve member 70 which is connected to threaded valve stem 72 which is threadably engaged in opening 74 of a block 76 which is tightly mounted within valve housing 64. Stem 72 is provided with a knurled valve handle 76.

OPERATION

In order to fill receptacle 67 to the desired level, a container 44 containing the desired liquid is threaded to connection 4. This operation is carried out with the connector and the container in approximately the positions shown in FIG. 2. The neck 46 of container 44 and connector 4 can be designed and dimensioned in a manner to insure that the correct liquid is being introduced into receptacle 67. The container 44 is then inverted and raised to the position shown in FIG. 1 which is readily accomplished due to the employment of the flexible tube 48.

At this point, it should be noted that connector 4 cannot be used simply as a funnel since the introduction of liquid into the connector 4 will simply result in the liquid discharging through the drain openings 6. By the same token, no liquid can be introduced through openings 58 in liquid level control pipe 56 due to the presence of shield 60. This insures that only liquid from a particular container will be used to fill vaporizer 67.

With container 44 in a position shown in FIG. 1, valve handle 76 is rotated counterclockwise to move valve member 70 off seat 78 and permit liquid to flow from container 44 through tube 12, flexible tube 48, tube 52, valve body 64 and tube 66 into vaporizer 67. The flow of liquid continues until it reaches a desired level as observed through a liquid level viewer indicated at 82 at which time valve handle 76 is turned clockwise until valve member 70 is seated against valve seat 68 to prevent the further introduction of liquid into vaporizer 67. However, should the flow of liquid not be shut off by the time it reaches the level indicated by the line 84 in FIG. 1, the liquid cannot rise further in vaporizer 67 since at this juncture the liquid will flow outwardly through openings 58 in liquid level control stem pipe 56 which are located at the desired maximum level of liquid in the vaporizer 67. Thus, over filling vaporizer 67 beyond a predetermined maximum level is prevented in a positive manner.

It will be observed that as liquid flows from container 44 air enters container 44 through pipe 16, cup-shaped member 26, and pipe 30.

Figure 2:
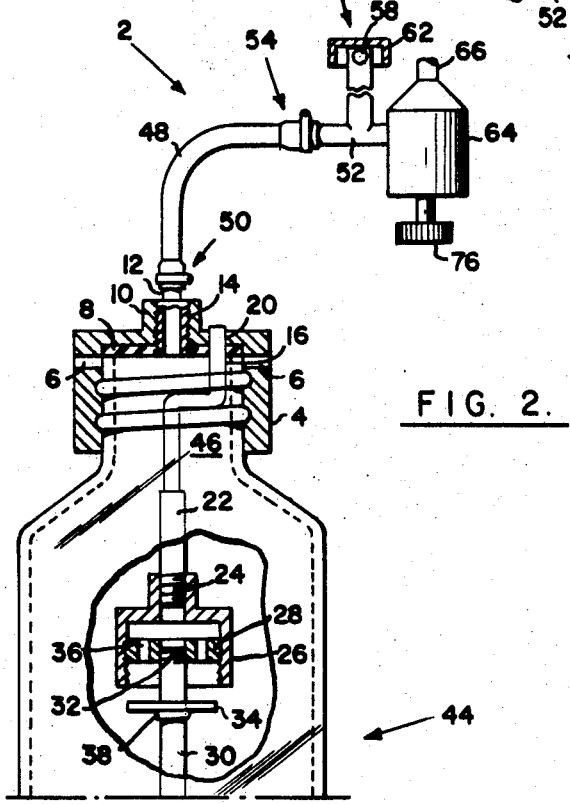
FIG. 2 is a front elevation of the apparatus of FIG. 1, partially broken away, with the container positioned to receive liquid from the receptacle.

When it is desired to remove liquid from vaporizer 67, a container 44 is threaded to connector 4 and the container positioned as shown in FIG. 2. When valve member 70 is lowered from valve seat 68, liquid can run from vaporizer 67 through tube 66, valve body 64, tube 52, flexible tube 48 and tube 12 into container 44. As liquid flows into container 44, air can escape from container 44 by passing through openings 36 in disc 28 through cup-shaped member 26 and tube 16 to the atmosphere.

It will be understood that the foregoing preferred embodiment is intended to be illustrative and is not limiting.

I claim:

1. A filling connection for a liquid receptacle comprising:
    conduit means adapted to be connected to the receptacle, at least a portion of said conduit means being flexible;
    means to detachably connect the conduit to a container;
    means to vent the container on emptying it in one position or on filling it when the container is inverted from said one position;

a valve connected in said conduit to control the rate of flow in said conduit; and a fixed liquid level control vent pipe connected to said conduit and having a vent opening in the plane of the maximum desired liquid level in the receptacle below the top of the receptacle.

2. A filling connection in accordance with claim 1 in which the means to detachably connect the conduit to a container includes a female connector member having drain holes to prevent its use as a funnel on disconnection from a container.

3. A filling connection in accordance with claim 1 in which the end of the liquid level control vent pipe, remote from the conduit, is closed and the said vent pipe is provided with an opening in its wall adjacent said remote end and a shield spaced from said opening to prevent the introduction of liquid through said opening.